United States Patent
Wiest et al.

(10) Patent No.: US 10,145,714 B2
(45) Date of Patent: Dec. 4, 2018

(54) ULTRASONIC FLOW MEASURING DEVICE HAVING A DOWNSTREAM RESISTANCE NETWORK FOR IMPROVED ZERO POINT STABILITY

(71) Applicant: Endress + Hauser Flowtec AG, Reinach (CH)

(72) Inventors: Achim Wiest, Weil am Rhein (DE); Oliver Brumberg, Rheinfelden (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 0 days.

(21) Appl. No.: 14/647,140

(22) PCT Filed: Nov. 12, 2013

(86) PCT No.: PCT/EP2013/073582
§ 371 (c)(1),
(2) Date: May 26, 2015

(87) PCT Pub. No.: WO2014/079733
PCT Pub. Date: May 30, 2014

(65) Prior Publication Data
US 2015/0316400 A1    Nov. 5, 2015

(30) Foreign Application Priority Data

Nov. 26, 2012    (DE) .......................... 10 2012 111 427

(51) Int. Cl.
*G01F 1/66* (2006.01)
(52) U.S. Cl.
CPC ................ *G01F 1/66* (2013.01); *G01F 1/667* (2013.01)
(58) Field of Classification Search
None
See application file for complete search history.

(56) References Cited

U.S. PATENT DOCUMENTS 4,114,439 A * 9/1978 Fick ........................ G01F 1/667
73/861.28
4,679,160 A    7/1987 Whitener
(Continued)

FOREIGN PATENT DOCUMENTS

DE    3542704 A1    7/1986
DE    19810798 A1    9/1998
(Continued)

OTHER PUBLICATIONS

International Search Report, EPO, The Netherlands, dated Feb. 17, 2014.

(Continued)

*Primary Examiner* — Harshad R Patel
(74) *Attorney, Agent, or Firm* — Bacon & Thomas, PLLC

(57) ABSTRACT

A field device, especially an ultrasonic, flow measuring device, comprising: a transmitter for producing an alternating exciter signal; and at least one transducer, especially first and second ultrasonic transducers. The transmitter additionally has a generator for producing the alternating exciter signal and a transmitting stage, wherein the generator is connected via the transmitting stage with at least the first ultrasonic transducer. An output of the transmitting stage is connected with the transducer, especially the first ultrasonic transducer, via a first signal path, wherein the first signal path has a first resistance element, wherein a second signal path branches from the first signal path, wherein the second signal path has a second resistance element connected on one side to ground for lessening impedance related fluctuations of the exciter signal, wherein the second signal path branches from the first signal path between the output of the transmitting stage and the first resistance element.

7 Claims, 5 Drawing Sheets

(56) References Cited

U.S. PATENT DOCUMENTS

| | | | |
|---|---|---|---|
| 5,168,762 A * | 12/1992 | Gill | G01F 1/662 |
| | | | 73/861.28 |
| 5,318,027 A | 6/1994 | Fukui | |
| 6,003,385 A * | 12/1999 | De Vanssay | G01F 1/66 |
| | | | 73/861.25 |
| 6,112,601 A * | 9/2000 | Bazin | G01F 1/667 |
| | | | 73/861.29 |
| 6,575,044 B1 * | 6/2003 | Feller | G01F 1/667 |
| | | | 73/861.27 |
| 6,584,861 B1 | 7/2003 | Jespersen | |
| 6,928,369 B2 | 8/2005 | Kishimoto | |
| 2013/0047695 A1 * | 2/2013 | Drachmann | G01F 1/662 |
| | | | 73/1.16 |
| 2015/0316400 A1 | 11/2015 | Wiest | |

FOREIGN PATENT DOCUMENTS

| | | |
|---|---|---|
| DE | 10048959 A1 | 5/2001 |
| DE | 2014079733 A1 | 5/2014 |
| EP | 0528693 B1 | 7/1997 |
| EP | 1394515 A1 | 3/2004 |

OTHER PUBLICATIONS

German Search Report, German Patent Office, Munich, DE, dated Sep. 25, 2013.
English Translation of the International Preliminary Report on Patentability, WIPO, Geneva, CH, Jun. 4, 2015.

* cited by examiner

ULTRASONIC FLOW MEASURING DEVICE HAVING A DOWNSTREAM RESISTANCE NETWORK FOR IMPROVED ZERO POINT STABILITY

TECHNICAL FIELD

The present invention relates to a field device, especially an ultrasonic, flow measuring device.

BACKGROUND DISCUSSION

Ultrasonic, flow measuring devices are widely applied in process and automation technology. They permit simple determination of volume flow and/or mass flow in a pipeline.

Known ultrasonic, flow measuring devices frequently work according to the travel-time difference principle. In the case of the travel-time difference principle, the different travel times of ultrasonic waves, especially ultrasonic pulses, so-called bursts, are evaluated as a function of the flow direction of the liquid. For this, ultrasonic pulses are sent at a certain angle to the tube axis both with, as well as also counter to, the flow. From the travel-time difference, the flow velocity can be determined and therewith, in the case of known diameter of the pipeline section, the volume flow.

The ultrasonic waves are produced, respectively received, with the assistance of so-called ultrasonic transducers. For this, ultrasonic transducers are mounted in and/or on the tube wall of the relevant pipeline section. There are also clamp-on ultrasonic, flow measuring systems. In the case of clamp-on ultrasonic, flow measuring systems, the ultrasonic transducers are pressed externally on the tube, or pipe, wall. A great advantage of clamp-on ultrasonic, flow measuring systems is that they do not contact the measured medium and can be mounted on an already existing pipeline.

The ultrasonic transducers are normally composed of an electromechanical transducer element, e.g. a piezoelectric element, and a coupling layer. Ultrasonic waves are produced in the electromechanical transducer element as acoustic signals and, in the case of clamp-on systems, led via the coupling layer to the tube wall and from there into the liquid or, in the case of inline systems, directly coupled via the coupling layer into the measured medium. The coupling layer is sometimes referred to as a membrane or diaphragm.

Transmission between the ultrasonic transducer and a corresponding measuring electronics occurs via a transmitting stage, which is embodied as a so-called push-pull stage. Starting from this transmitting stage, signal transmission of a supply voltage occurs via a resistor, respectively an impedance, to an ultrasonic transducer in the transmitting state.

Problematic is that after the last transmission pulse, the output of the push-pull stage is high resistance, which leads to a shifting of the output voltage by a value significantly above/below zero volt. This is shown in FIG. 4.

SUMMARY OF THE INVENTION

An object of the invention is to provide a field device, which has a transmitter with an output impedance that is as constant as possible and wherein the transmitter includes a generator for producing a transmission voltage, wherein the generator has a changing impedance. Especially, as great a frequency range as possible should be covered and the impedance of the transmitter should be independent of the impedance of the connected transducer.

An object of the invention is especially to provide an ultrasonic, flow measuring device, which enables an improved oscillatory behavior of the piezo crystal of an ultrasonic flow meter.

According to the invention, a field device includes at least one transmitter, respectively a transmitting stage, which generates an alternating exciter signal. The exciter signal can be, for example, a transmission voltage and is, for example, converted into an electromagnetic field, especially a microwave signal, or into an ultrasonic signal or optical signal. Especially, the ultrasonic, flow measuring device includes at least one ultrasonic transducer. In such case, the transmitter of the flow measuring device includes additionally a generator for producing an alternating output signal, for example, a transmission voltage, and a transmitting stage, wherein the measuring electronics is connected via the transmitting stage at least with the first ultrasonic transducer.

A corresponding generator includes in its simplest form of embodiment at least one voltage source and at least one switch or a changeable resistance.

An output of the transmitting stage is connected to the ultrasonic transducer via a first signal path, in which a resistance network is located, wherein the first signal path includes a first resistance element. According to the invention, a second signal path branches from the first signal path, wherein the second signal path includes a second resistance element connected on one side to ground, wherein the second signal path branches from the first signal path between the output of the transmitting stage and the first resistance element.

Through a corresponding selection of the resistance elements, a more reciprocal signal form of the output voltage is achieved in the case of sending in comparison to the signal form in the case of receipt than with a single resistor in the signal path or a preset size, thus signals with smaller deviation or almost identical signal form.

By a corresponding choice of resistance elements, it is possible to pair the output impedance of the transmitter and the input impedance of the receiver ideally, so that the reciprocity theorem is virtually assured. With the theorem, zero point stability is virtually maximally achieved.

The generator for producing two different voltages, e.g. one positive and one negative, is composed preferably of two switches, whose inputs are connected with different potentials. The outputs of the switches are connected with one another. Together with the (thereto connected) matching network, they form the transmitting stage, which is so embodied that the equivalent resistance of the network corresponds as much as possible to the resistance of the receiver—independently of the switch positions. Practically speaking, a compromise must be found between "match" and electrical current consumption.

An especially high phase or zero point stability can advantageously be achieved by providing in the first signal path between the output of the transmitting stage and the first resistance element at least one resistance network, wherein the resistance network includes the second resistance element connected on one side to ground. In the present case, the resistance network enables an improved zero point stability in the case of measuring.

It is advantageous when the second ultrasonic transducer is connected with the generator via a receiving stage and wherein between the transmitting stage and the first ultrasonic transducer a first impedance is arranged and wherein between the receiving stage and the generator a second impedance is arranged and wherein the resistance network and the first resistance element forms the first impedance, which deviates by less than 100%, preferably less than 10%, especially preferably less than 2%, especially less than 0.5%, from the second impedance. In this way, an especially reproducible (preferably reciprocal) behavior is enabled/achieved in the oscillatory behavior in the case of sending and receiving of the piezo crystal.

It is additionally advantageous when the resistance network has a third resistance element, wherein a resistance value of the second resistance element to a resistance value of the third resistance element has a ratio from 2:1 to 10000:1, preferably 3:1 to 100:1, especially preferably 4.5:1 to 10:1.

The resistance network can advantageously have a third resistance element, wherein the fraction formed from a resistance value of the second resistance element to the sum of the resistance values of the second and the third resistance elements of the resistance network amounts to more than 0.2, preferably more than 0.75. The aforementioned conditions lead to only a small loss of electrical voltage.

In order to cover an enlarged measuring range of the ultrasonic measuring device, such can advantageously be operated with a frequency range between 0.05 to 100 MHz.

A multiplexer controlled by the measuring electronics can switch between a number of transducers and at least one generator of the transmitting stage as well as of at least one receiving stage The ultrasonic transducer can be connected via an additional multiplexer, controlled likewise by the measuring electronics, to another transmitting stage or also only to an additional generator, which forms together with the internal resistance of the transmitting stage the input impedance. In choosing resistance values in the signal paths, the typical impedances of the switches and voltage sources can be taken into consideration.

The flow measuring device possesses typically 5 to 20-times better zero point stability compared with a flow measuring device with a transmitting stage without a downstream resistance network. As a result, the measured values have a higher accuracy, respectively a smaller scatter.

The ultrasonic, flow measuring device can be applied especially as a battery operated ultrasonic, flow measuring device, two-conductor ultrasonic, flow measuring device and/or in explosion protected regions, since the energy consumption is typically significantly less compared with a zero-point comparable solution with operational amplifier in pulsed transmission operation. Typical pulse-pause ratios lie at >1:100.

BRIEF DESCRIPTION OF THE DRAWINGS

Preferred examples of embodiments of the invention will now be explained in greater detail based on the appended drawing, the figures of which show as follows:

FIG. 5 shows output voltage after push-pull stage according to the modification of the invention shown in FIG. 3a;

DETAILED DISCUSSION IN CONJUNCTION WITH THE DRAWINGS

In the realm of the travel-time difference method for ascertaining a flow velocity by means of ultrasonic transducers, it is already known that an ultrasonic transducer of an ultrasonic, flow measuring device makes use of at least two operating states, a transmitting, or sending, state and a receiving state. For the better understanding of the invention, only one operating state is explained in detail for each of the ultrasonic transducers. It is understood, however, that a given ultrasonic transducer in the transmitting state also can be switched to a receiving state and, conversely, an ultrasonic transducer in the receiving state can be switched to the transmitting state, so that an ultrasonic device is embodied in such a manner that a transmitting stage can also function as a receiving stage and a receiving stage can also function as a transmitting stage.

Figure 1:
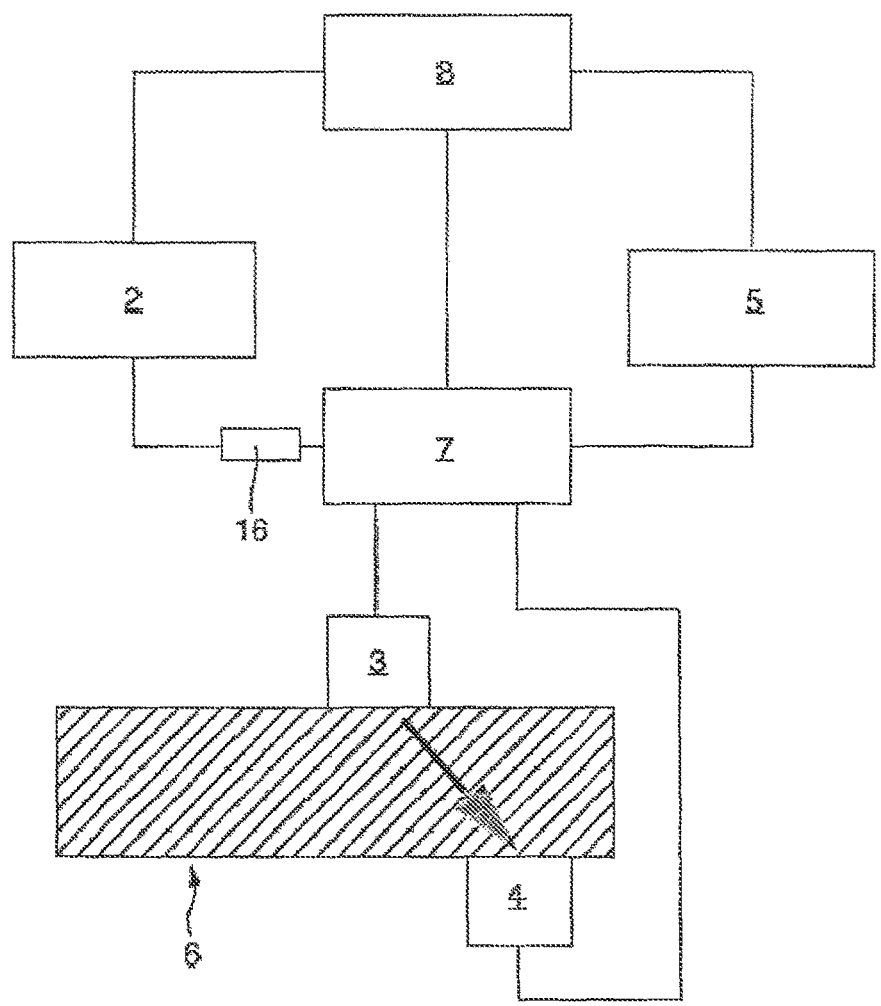
FIG. 1 is a schematic view of a circuit of an ultrasonic measuring device.

FIG. 1 shows a per se known circuit of an ultrasonic, flow measuring device, which works especially according to the travel-time difference method. The basic construction of such a device and the workings of the travel-time difference method are long since known. Starting from a measuring electronics 1, an input signal is formed as voltage signal via a first amplifier, respectively a transmitting stage, 2, a first resistance element 16 and a multiplexer 7 to a first one-side grounded, ultrasonic transducer 3, which is located in the n transmitting state. This first ultrasonic transducer 3 is embodied as a piezo transducer and sends upon receipt of the voltage signal an ultrasonic signal to a second, one side grounded, ultrasonic transducer 4, which is located in the receiving state. For switching the transducers 3 and 4 from transmitting into receiving operation, a multiplexer 7 can be provided, which is connected with the transducers 3 and 4 of the receiving stage 5 and the transmitting stage 2. The second transducer 4, in such case, receives the acoustic measurement signal and forwards this signal in the form of an output voltage via the multiplexer 7 and a receiving stage 5 to the measuring electronics 8.

The acoustic measurement signal is, in such case, introduced into a measuring tube 6 and a medium located therein and is, in such case, transmitted as a so-called burst packet and is composed, for example, of five full waves. These are sent multiple times. The second ultrasonic transducer 4 transduces the acoustic signal into a voltage signal and sends this voltage signal to the measuring electronics 1.

As a result of the circuit, there forms between the measuring electronics 8 and the first ultrasonic transducer 3 a first impedance, the so-called input impedance. And, between the second ultrasonic transducer 4 and the measuring electronics 8, there is a second impedance, the so-called receipt impedance. Resistance 16 is taken out of the transmitting stage 2 in FIG. 1 and separately drawn.

An optimal solution has proven to be that in which the first and second impedances in the cases of sending and receiving, thus the so-called output and input impedances, are approximately equally large. This solution has proved to be especially favorable, since the phase stability of the measuring or the zero-point of the flow is then small and stable.

Opposing the above-described advantage of a stable zero point, however, are an increased electrical current draw and a higher space requirement for components for producing the transmission signal. Usually, a high voltage is implemented by appropriate semiconductor transistors—which switch back and forth between a positive and a negative supply voltage. A greatly simplified circuit known from the state of the art is shown in FIG. 2.

Figure 2:
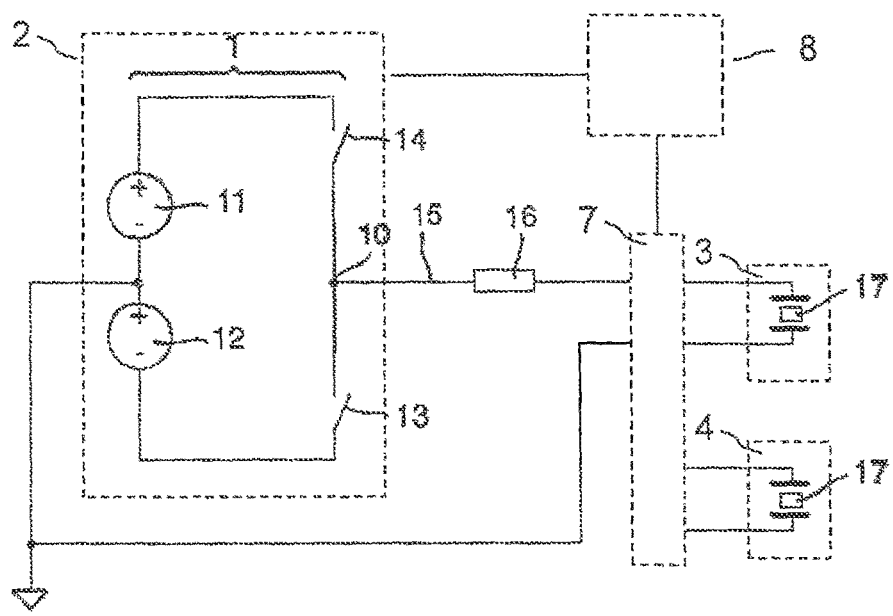
FIG. 2 is a schematic view of a circuit with a push-pull end stage formed as a transmitting stage according to the state of the art.

The circuit of FIG. 2 includes an output 10 of the transmitting stage and a first voltage supply source 11 for supplying the ultrasonic transducer 3 with a voltage, as well as a second voltage supply source 12 for supplying the ultrasonic transducer 3 with a voltage with reverse polarity compared to the voltage of the first voltage supply source 11. Arranged between the output 10 of the transmitting stage, respectively push-pull stage, and the respective voltage supply sources 11 or 12 are, in each case, a switch 13 or 14, thus a switch 13 associated with the first voltage supply source 11 and a switch 14 associated with the second voltage supply source 12. The output of the transmitting stage is connected via a first signal path 15 with the ultrasonic transducer 3.

The totality composed of the output 10, the voltage supply sources 11 and 12 and the switches 13 and 14 will be referred to below as generator 1.

The first signal path 15 includes a first resistance element 16, the so-called output resistance. This as evident from FIG. 2 is connected in series with the push-pull stage, respectively transmitting stage, 2 and the ultrasonic transducer 3.

Figure 8:
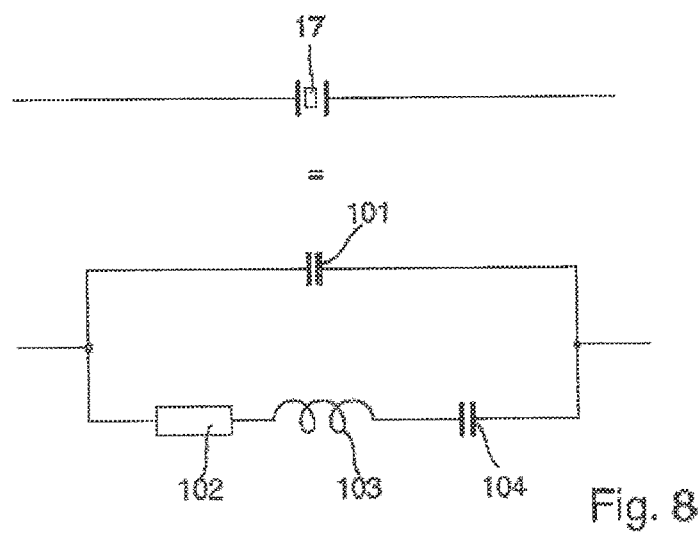
FIG. 8 is an equivalent circuit diagram of a piezo crystal.

Such circuits are known to those skilled in the art as push-pull stages. For matching the impedance, a resistance is installed, which corresponds, approximately, to the input resistance of the receiving stage. As shown in FIG. 2, the push-pull stage is connected output side with a circuit 17 of the piezo crystal, respectively of the ultrasonic transducer. Such piezo crystal circuits are, however, already multiply described in the state of the art and are in the present application only described, by way of example, based on the construction of the equivalent circuit of FIG. 8. The corresponding piezo crystal circuit includes two parallel capacitors 101 and 104 and a coil 103 and a resistor 102 connected in series with one of the capacitors.

Figure 4:
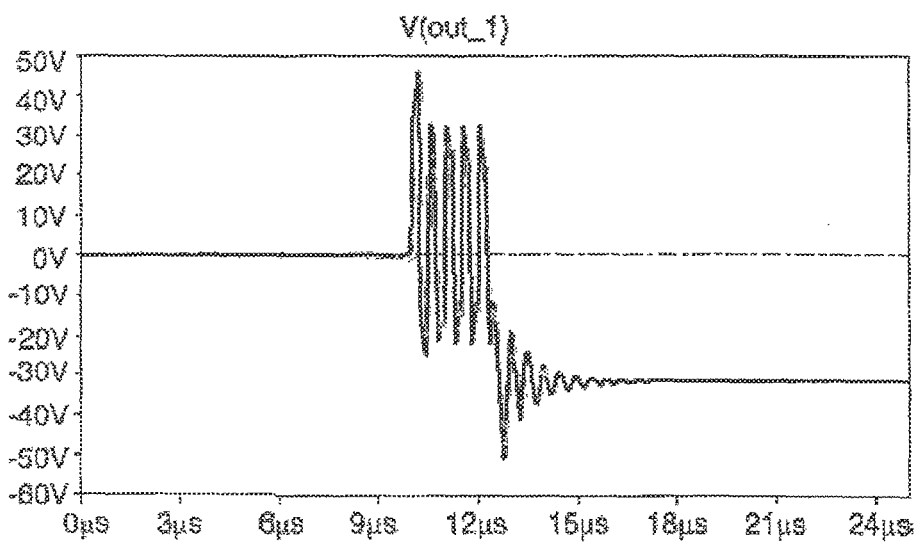
FIG. 4 shows output voltage with push-pull stage according to the state of the art.

Problematic is that after the last transmission pulse the output of the push-pull stage is high resistance, which leads to a shifting of the output voltage toward a value significantly above/below zero volt, such as shown in FIG. 4.

In this way, the piezo crystal is supplied with a voltage, which leads to an undamped settling of the piezo crystal.

This problem is removed according to the invention by features including that from the first signal path 15 between the first resistance element 16 and the output of the transmitting stage a second signal path branches and contains a second resistance element 18, which is grounded on one side. On the whole, the arrangement of the first and second resistance elements 16 and 18 serves for supplying an output voltage to the ultrasonic transducer 3 and represents the first impedance described with respect to FIG. 1. In practice, this changed circuit is represented in FIG. 3a with a resistance network.

Figure 3A:
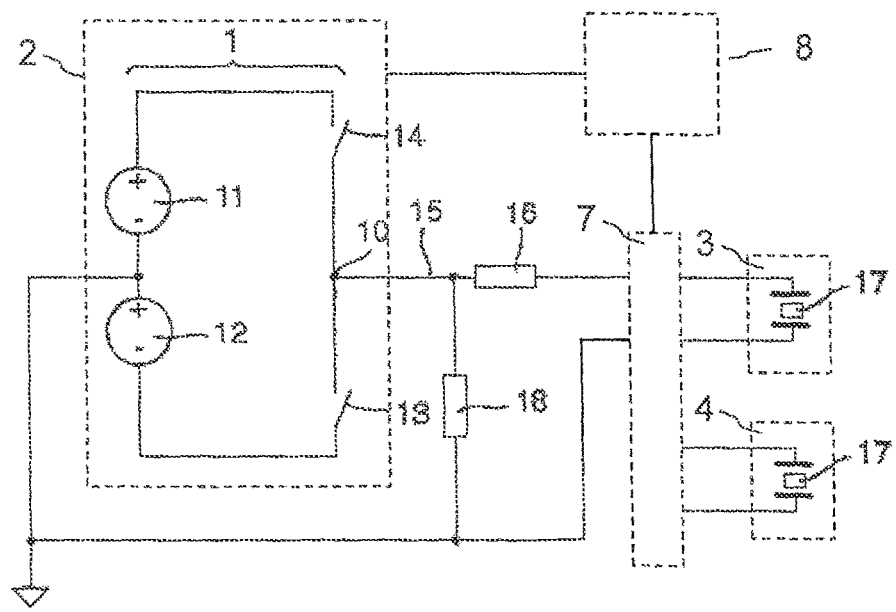
FIG. 3a is a schematic view of a first circuit of the invention of a push-pull end stage formed as transmitting stage with downstream resistor connected on one side to ground.

Analogously to FIG. 2, also in FIG. 3a a first signal path is arranged between the switches 13 and 14. In contrast to FIG. 2, however, there branches from this first signal path 15 a second signal path with the one side grounded, second resistance element 18. The ratio of the resistance values of this second resistance element 18 to the output resistance element 16 downstream of the branching off of the second resistance element 18 amounts preferably to less than 1:10000, especially preferably less than 1:10, ideally between 1:6 to 1:8. Located downstream means in this connection that the output resistance 16 is arranged between the ultrasonic transducer 3, respectively the circuit 17 of the piezo crystal, and the branch of the signal path with the one side grounded, second resistor. Correspondingly, there holds for the electrical currents in the case of sending that $I_{16} < I_{18}$ In an especially preferred embodiment of FIG. 3b, a third resistance element 19, which is connected in series with the output resistance element 16, is upstream of the branching off of the one side grounded, second resistance element 18. The second resistance element 18 forms together with the third resistance element in the preferred example of an embodiment of FIG. 3b a resistance network.

Figure 3B:
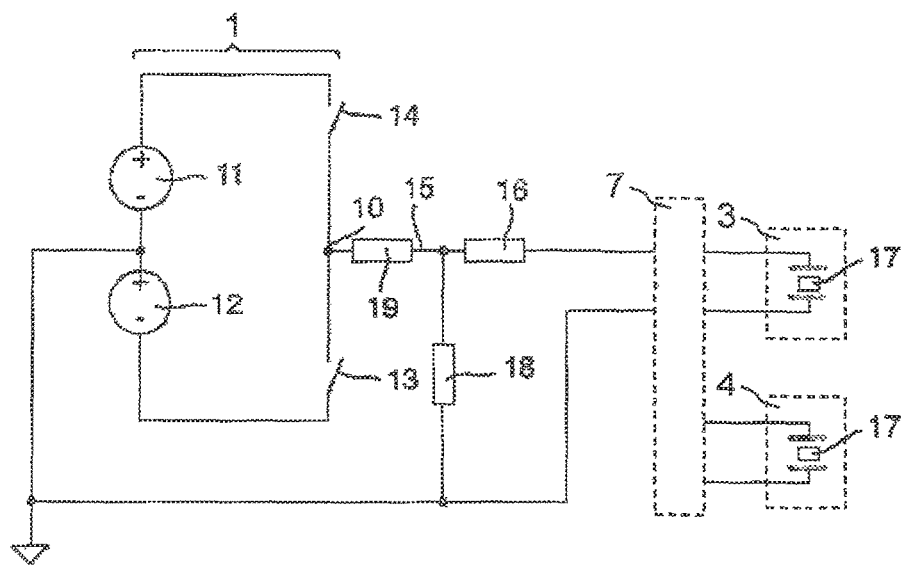
FIG. 3b is a schematic view of a second circuit of the invention of a push-pull end stage formed as transmitting stage with output modified according to the invention.

As already explained with reference to FIG. 1, the output impedance, thus the sum of the resistance values connected in front of the output, should be approximately equal to the input impedance, wherein the output impedance in FIG. 3b is predetermined by the first, second and third resistance elements 16, 18, 19. If the input impedance amounts to, for example, 50 ohm, then the output impedance should also be 50 ohm.

Ideally, the output impedance is kept approximately the same during the transmitting, or sending, of the burst packet and during the transmitting pause. For this, the ratio of the second resistance element 18 to the third resistance element 19 is from 2:1 to 10000:1, preferably 3:1 to 100:1, especially preferably 4:1 to 10:1.

After the sending, or transmission, the output impedance results from the sum of the resistance values of the output resistance element 16 and the second resistance element 18. This output impedance deviates by less than 100%, preferably less than 10%, especially preferably by less than 2% especially less than 0.5%, from the input impedance.

The fraction x of the voltage remaining for transmission in percent compared with the solution of FIG. 3a can be roughly ascertained in the case of R18<<R16 based on the following formula: $x=(R18/(R18+R19))*100$.

The fraction x represents the remaining voltage and amounts to preferably more than 0.2, preferably more than 0.75, of the original generator voltage at the point 10.

The voltage loss is actually disadvantageous for the operation of the flow measuring device, however, this disadvantage is more than overcome by an improved zero point stability.

The voltage loss can additionally be compensated by the transmitting stage by a higher voltage or by adjusting the amplification.

On the whole, the zero point stability is improved by 5 to 20 times.

On the whole, the circuits of FIGS. 3a and 3b can implement an expanded frequency range of preferably between 0.1 to 10 MHz.

Additionally, a corresponding ultrasonic, flow measuring device can be used in applications with small energy budget, especially for battery driven ultrasonic measuring devices and two-conductor ultrasonic measuring devices. Especially, through the use of passive components, no additional energy is required after producing the burst for assuring reciprocity.

FIGS. 4 and 5, 6 and 7 show output voltage as a function of time in the case of circuits according to FIGS. 2 and 3a and FIG. 3b.

In such case, FIG. 4 shows that the output voltage settles to a voltage value of −40V. This transient behavior is for a turning off of the push-pull stage after sending a burst signal composed of five full-waves. As earlier described, there remains due to the circuit the high-ohm state of the last full-wave. About this high resistance state, which, depending on opened switch can be, for example, −40V or +40 V, a transient settling of the voltage occurs.

Figure 5:
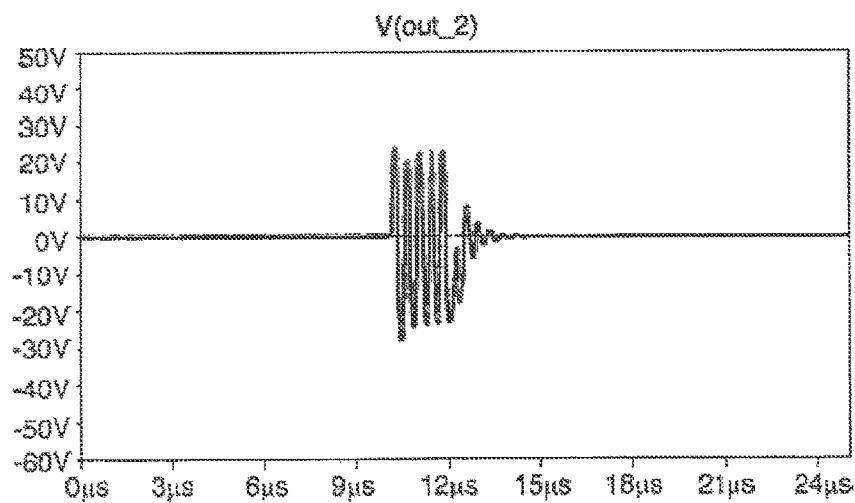

The curve shown in FIG. 5 exhibits an asymptotic damping to zero volt, so that there is no longer a voltage. In this way, a damped and comparatively rapid settling of the connected piezo crystal can occur.

Alternatively to a settling to zero volt, corresponding adjustment of the resistance network can lead to a settling to a predetermined desired value, which corresponds to an internal resistance of the transmitting stage.

Figure 6:
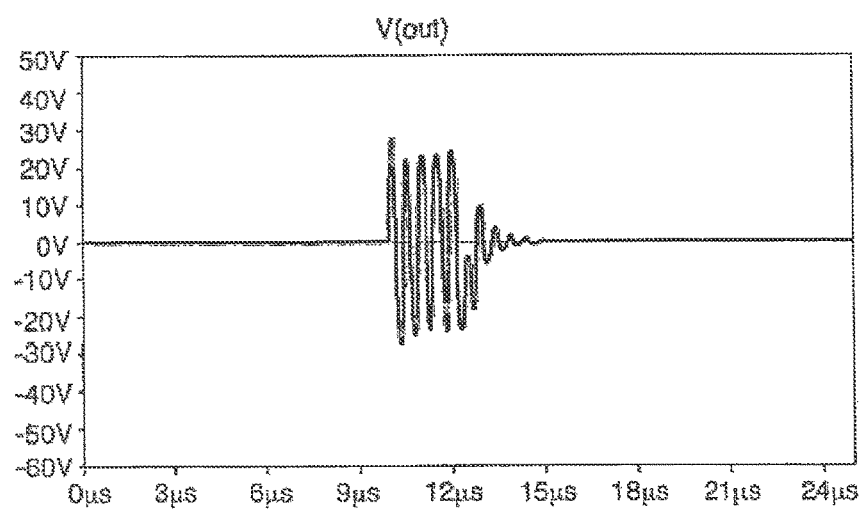
FIG. 6 shows output voltage after push-pull stage according to the modification of the invention shown in FIG. 3b.
Figure 7:
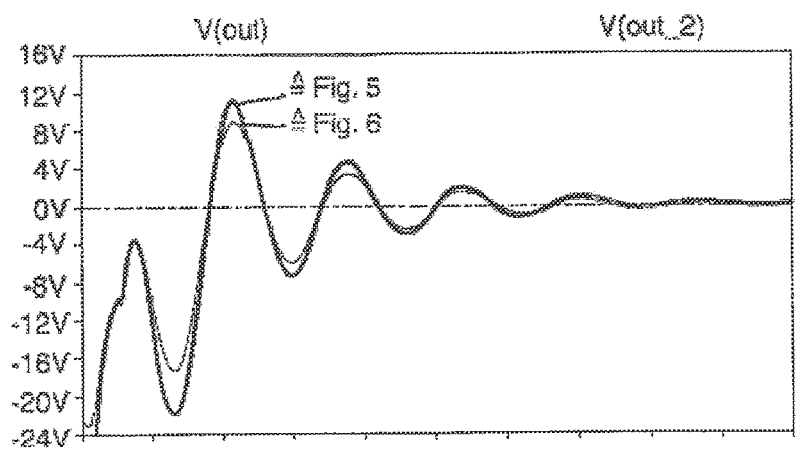
FIG. 7 is an enlarged view of the settling behavior of the output voltages of FIGS. 5 and 6.

The resistance network in FIG. 3a is, in principle, not a usual voltage divider, since an electrical current flows from the transmitting stage via the resistor 18 to ground. It can be understood as an electrical current divider. The resistance ratio relative to resistance 16 is so selected that the electrical current through resistor 18 is a multiple higher than the electrical current, which flows through the load, the ultrasonic sensor. The goal is, such as described in the next section, to assure an almost identical impedance for the sending and receiving ultrasonic transducers at all times. The additional resistor 19 effects, such as shown in FIGS. 6 & 7, a better approach to the optimum, such as is shown by the following calculations.

In the case of generator circuit 3b and presence of the output impedances at the current divider of the closed switch 14, respectively alternatively also 13, in the case of ideal voltage sources 11 and 12 without internal resistance and switches without resistance, the following relationship holds:

$$R_i = R16 + \frac{R18 * R19}{R18 + R19}.$$

In the case of open switches 14 and 13, the internal resistance is:

$R_i = R16 = R18.$

This holds in the case of the circuits of FIGS. 3a and 3b

In the case of a circuit of FIG. 3a and closed switch 14, respectively alternatively also 13, in the case of ideal voltage sources 11 and 12 without internal resistance and switches without resistance:

$R_i = R16.$

As can easily be seen, the optimum lies at R18=0 ohm. Of course, this is no solution at all. Thus, the solution is here a compromise with R18<<R16, e.g. 1:8, and as regards power consumption.

The invention claimed is:

1. An ultrasonic flow measuring field device, comprising: a transmitting stage, said transmitting stage including a generator for producing an alternating exciter signal, and first and second ultrasonic transducers, wherein:
said generator of said transmitting stage is connected with at least said first ultrasonic transducer;
an output of said transmitting stage is connected with said first ultrasonic transducer via a first signal path, said first signal path includes a first resistance element;
a second signal path permanently branches from said first signal path between the output of said transmitting stage and said first resistance element;
said second signal path includes a second resistance element permanently connected on one side to ground and permanently connected on the other side to the first signal path for lessening impedance related fluctuations of said exciter signal;
the resistance value of the second resistance element is smaller than the resistance value of the second resistance element, such that during sending of the transmitting stage, the current across the first resistance element is smaller than the current across the second resistance element;
said generator comprises two voltage supply sources, each with a respective switch; and
the output of said transmitting stage is arranged between respective switches of said two voltage supply sources for supplying said first respective transducer, with voltage of opposite polarity.

2. The field device as claimed in claim 1, wherein:
said first signal path between the output of said transmitting stage and said first resistance element has at least a third resistance element; and
said second signal path branches from said first signal pat between said first and third resistance element.

3. The field device as claimed in claim 2, wherein:
a resistance value of said second resistance element to a resistance value of said third resistance element forms a ratio of 4:1 to 15:1.

4. The field device as claimed in claim 2, wherein:
a resistance value of said second resistance element to a resistance value of said third resistance element forms a ratio 4.5:1 to 10:1.

5. The field device as claimed in claim 2, wherein:
a fraction of a resistance value of said second resistance element to the sum of the resistance values of said second and said third resistance elements amounts to more than 0.75.

6. The field device as claimed in claim 1, wherein:
the field device is operable as an ultrasonic, flow measuring device with a frequency range between 0.05 to 100 MHZ.

7. The field device as claimed in claim 1, wherein:
the field device has a first multiplexer controlled by a measuring electronics and serving for switching between said first and second ultrasonic transducers, which are connected with said generator.

* * * * *